United States Patent
Dziekan et al.

(10) Patent No.: US 7,681,912 B2
(45) Date of Patent: Mar. 23, 2010

(54) AIRBAG DEPLOYMENT DISABLING SYSTEM

(75) Inventors: Lee M. Dziekan, Metamora, MI (US); James E. Van Hout, Auburn Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 352 days.

(21) Appl. No.: 11/773,781

(22) Filed: Jul. 5, 2007

(65) Prior Publication Data

US 2009/0008916 A1     Jan. 8, 2009

(51) Int. Cl.
*B60R 21/16*    (2006.01)
(52) U.S. Cl. .......................................... 280/735; 701/45
(58) Field of Classification Search ................. 280/735; 701/45

See application file for complete search history.

(56) References Cited

U.S. PATENT DOCUMENTS

| | | | | |
|---|---|---|---|---|
| 5,165,717 A | | 11/1992 | Tanaka | |
| 5,828,138 A | * | 10/1998 | McIver et al. | 307/10.1 |
| 5,938,234 A | * | 8/1999 | Cuddihy et al. | 280/735 |
| 6,038,495 A | * | 3/2000 | Schiffmann | 701/1 |
| 6,043,566 A | * | 3/2000 | Bryant et al. | 307/10.1 |
| 6,147,417 A | * | 11/2000 | Ueno | 307/10.1 |
| 6,703,845 B2 | * | 3/2004 | Stanley et al. | 324/663 |
| 2007/0152432 A1 | * | 7/2007 | Uchida | 280/735 |

\* cited by examiner

*Primary Examiner*—Toan C To
(74) *Attorney, Agent, or Firm*—Ralph E. Smith

(57) ABSTRACT

A system for inhibiting deployment of an airbag includes a rollover sensor and a circuit that are enclosed in an enclosure. The enclosure is mounted on a surface that is at a predetermined potential. The circuit detects presence of the predetermined potential when the enclosure is mounted on the surface. The circuit detects absence of the predetermined potential when the enclosure is dismounted from the surface. The circuit inhibits deployment of the airbag when absence of the predetermined potential is detected.

15 Claims, 4 Drawing Sheets

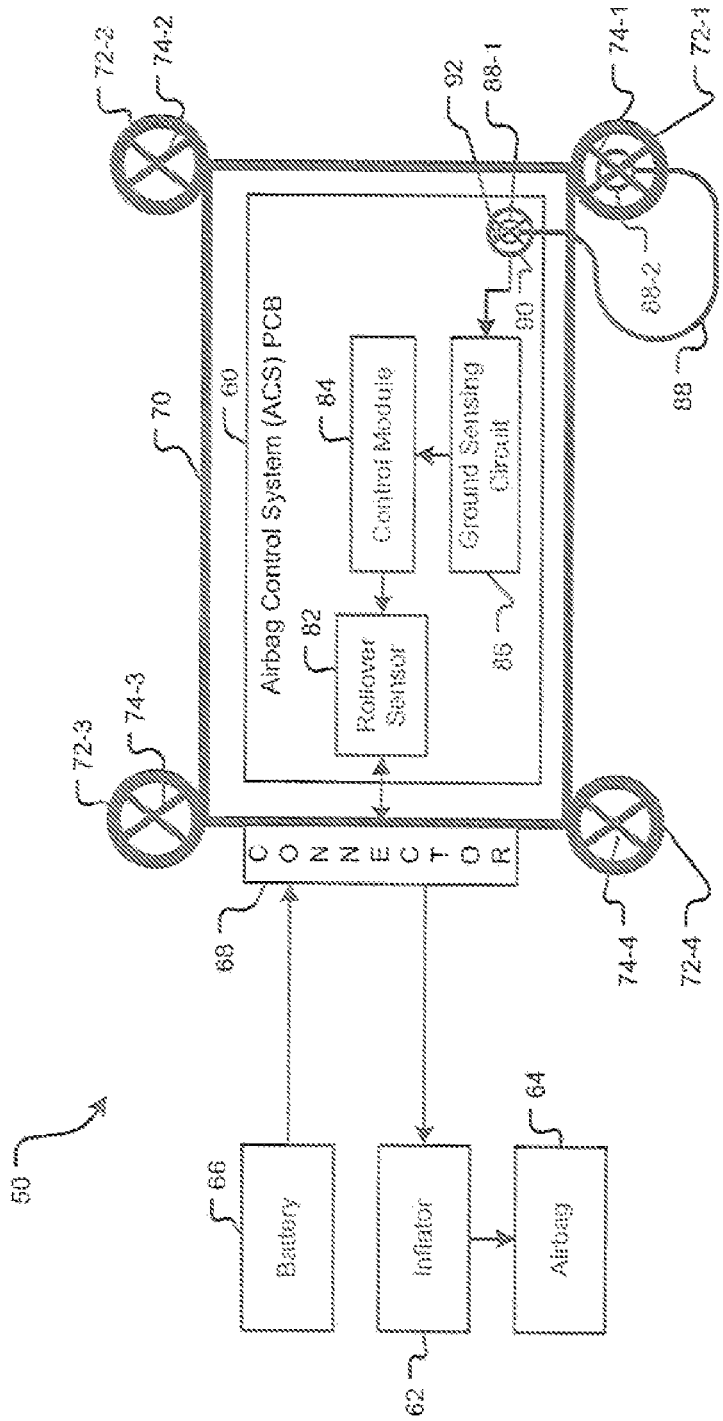
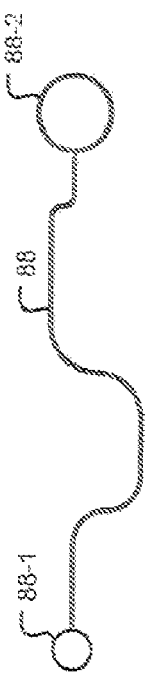
FIG. 2A
FIG. 2B

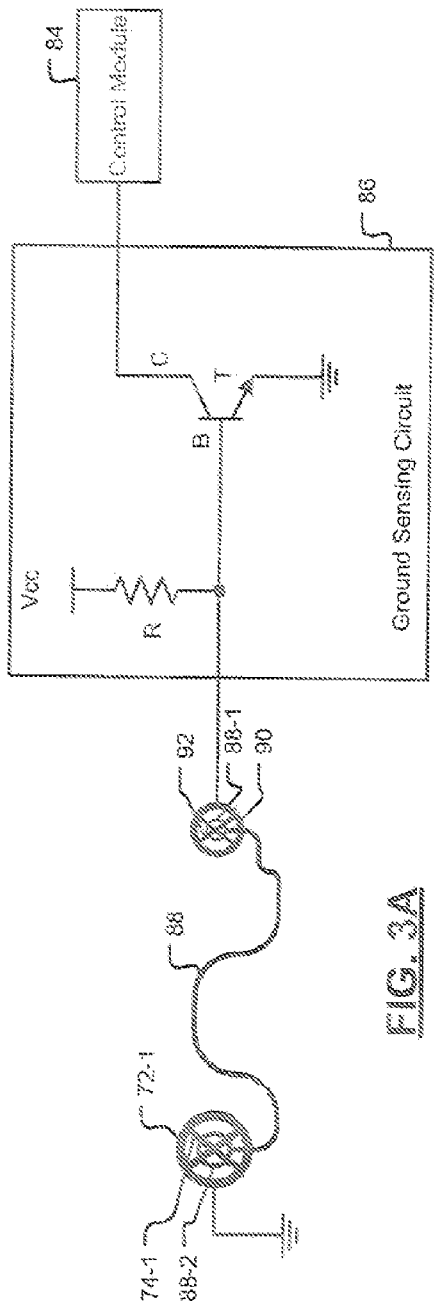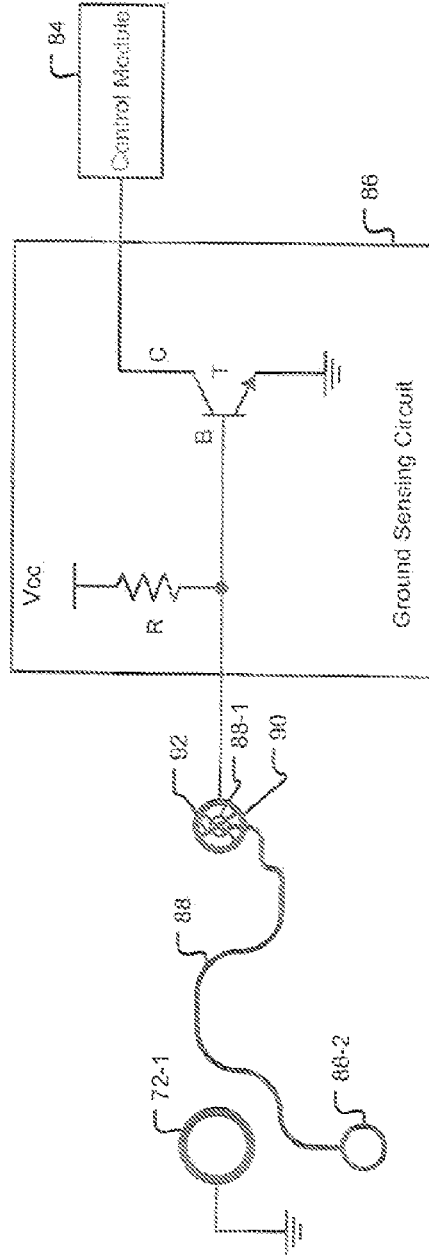

AIRBAG DEPLOYMENT DISABLING SYSTEM

FIELD

The present invention relates to vehicle safety systems, and more particularly to systems and methods for disabling airbag deployment during maintenance operations.

BACKGROUND

Referring now to FIG. 1A, an airbag restraint system (ARS) 10 that deploys one or more airbags in the event of a collision is shown. The ARS 10 comprises an airbag control system (ACS) 11 that detects the collision, an inflator 14, and an airbag 16. The ACS 11 includes a crash sensor 12 and a control module 13. The crash sensor 12 senses the force of impact when a collision occurs. When the force is greater than a predetermined value, the crash sensor 12 generates a control signal. On receiving the control signal, the inflator 14 inflates the airbag 16. The control module 13 comprises control circuitry that controls the operation of the ARS 10.

Referring now to FIG. 1B, an ARS 20 that deploys one or more airbags in the event of a rollover is shown. The ARS 20 comprises an ACS 21 that detects the rollover, an inflator 24, and an airbag 26. The ACS 21 includes a rollover sensor 22 and a control module 23. The rollover sensor 22 senses a roll angle of the vehicle when rollover is imminent. When the roll angle is greater than a predetermined value, the rollover sensor 22 generates a control signal. On receiving the control signal, the inflator 24 inflates the airbag 26. The control module 23 comprises control circuitry that controls the operation of the ARS 20.

Mechanical switches are typically used to disable deployment of airbags during maintenance operations. Mechanical switches may, however, become inoperative over time. Consequently, airbags may inadvertently deploy during maintenance operations. Particularly, ACSs that detect rollovers may deploy airbags when the ACSs are being removed from vehicles for maintenance purposes while power to the ACSs is on.

SUMMARY

A system for inhibiting deployment of an airbag includes a rollover sensor and a circuit that are enclosed in an enclosure. The enclosure is mounted on a surface that is at a predetermined potential. The circuit detects presence of the predetermined potential when the enclosure is mounted on the surface. The circuit detects absence of the predetermined potential when the enclosure is dismounted from the surface. The circuit inhibits deployment of the airbag when absence of the predetermined potential is detected.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a block diagram of an exemplary ARS that disables deployment of an airbag according to the present invention;

FIG. 2B depicts a conductor used in the ARS of FIG. 2A;

FIGS. 3A and 3B depict an exemplary ground sensing circuit used in the ARS of FIG. 2A.

DETAILED DESCRIPTION

The present invention discloses an airbag control system (ACS) that comprises a circuit that detects when the ACS is being dismounted from a vehicle while power to the ACS is on and that prevents deployment of an airbag. The ACS is enclosed in a conducting or a non-conducting enclosure. The enclosure is mounted on an electrically grounded surface in a vehicle. A conductor such as a cable connects the circuit to the grounded surface when the enclosure is properly mounted.

The circuit detects when the enclosure is mounted or dismounted by sensing a connection or a disconnection to the grounded surface, respectively. When the circuit senses the connection, the ACS determines that the enclosure is properly mounted in the vehicle and enables normal deployment of an airbag. Conversely, when the circuit senses the disconnection, the ACS determines that the enclosure is being dismounted and disables the deployment of the airbag.

Figure 1A:
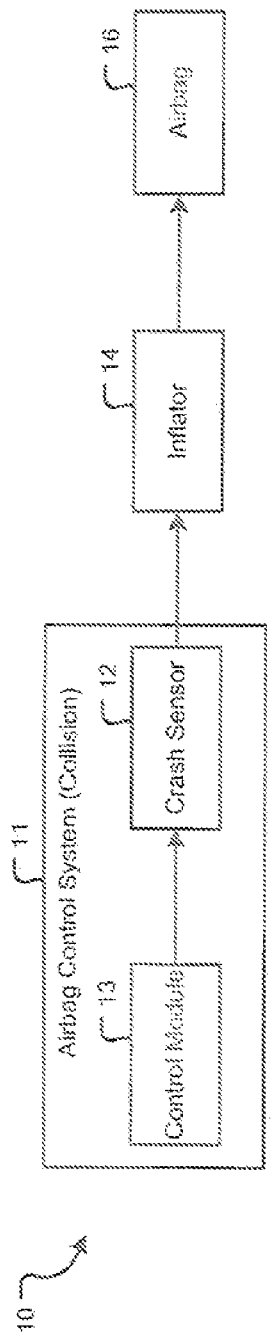
FIG. 1A is a block diagram of an exemplary airbag restraint system (ARS) according to the prior art.
Figure 1B:
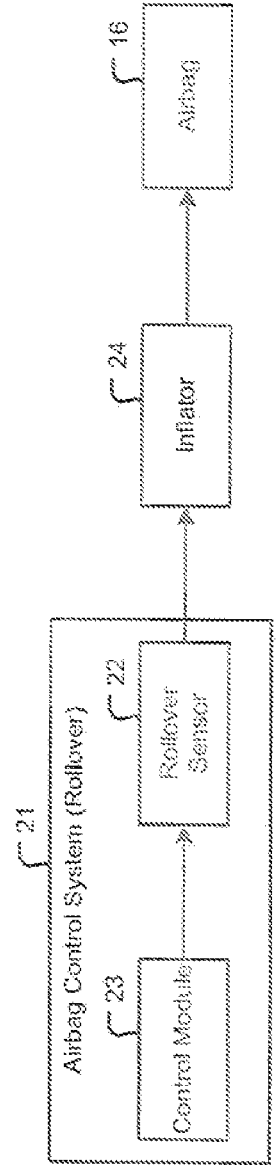
FIG. 1B is a block diagram of an exemplary ARS according to the prior art.
Figure 4:
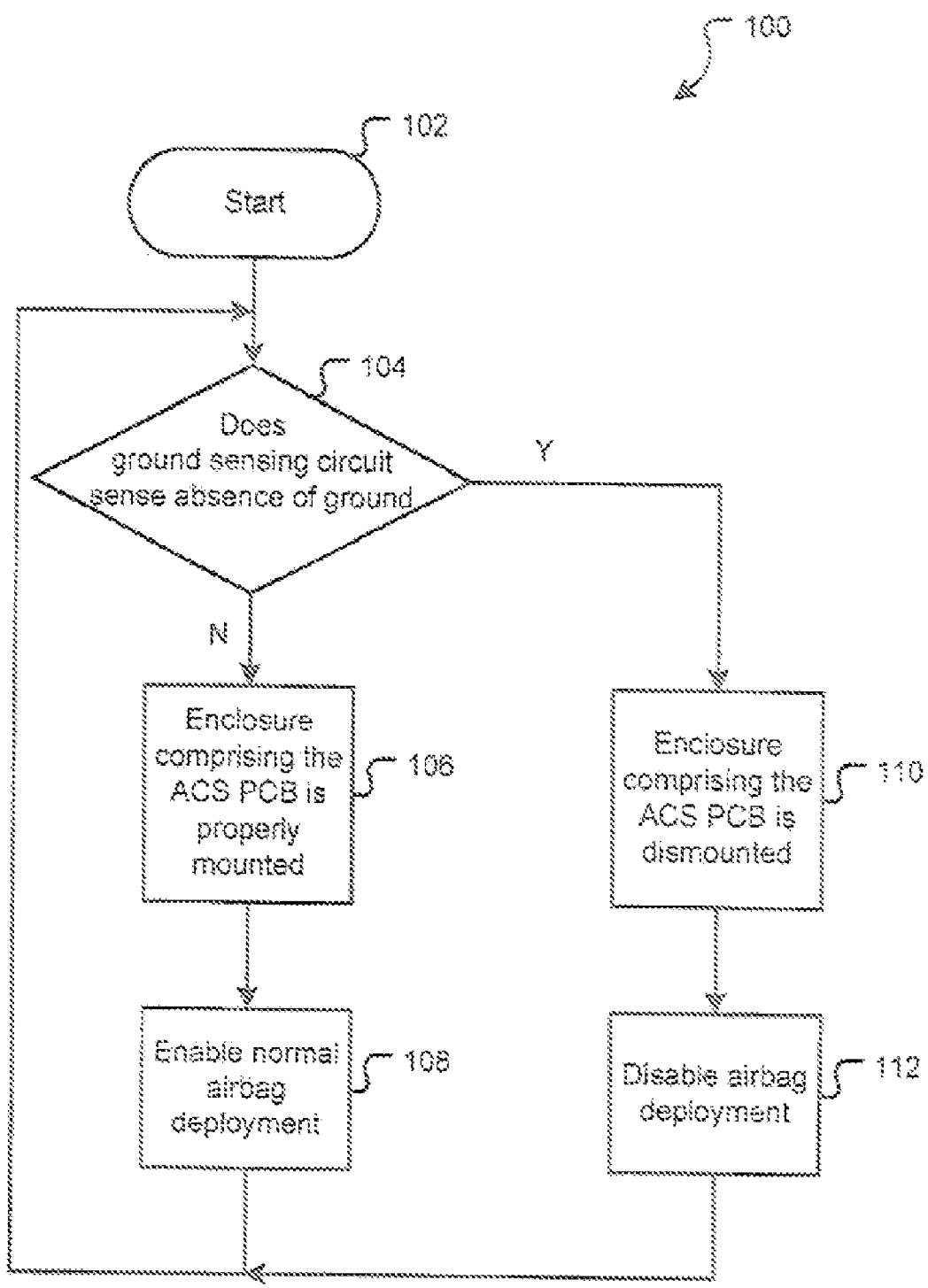
FIG. 4 is a flowchart of an exemplary method for disabling deployment of an airbag according to the present invention.

Before a detailed description is presented, an overview of the drawings is presented. FIGS. 2A and 2B show the ACS comprising the circuit that detects when the enclosure is being dismounted and that disables deployment of the airbag. FIGS. 3A and 3B show examples of the circuit that detects the connection to and disconnection from the grounded surface. FIG. 4 depicts a flowchart of a method for disabling deployment of the airbag based on a connection between the circuit and the grounded surface.

Referring now to FIGS. 2A and 2B, an airbag restraint system (ARS) 50 that defects rollovers is shown. In FIG. 2A, the ARS 50 comprises an ACS arranged on a printed circuit board (ACS PCB) 60, an inflator 62, and an airbag 64. The ACS PCB 60 communicates with the inflator 62 and a battery 66 via a connector 68. The ACS PCB 60 comprises a rollover sensor 82 and a control module 84. The rollover sensor 82 detects when a rollover is imminent and generates a rollover signal. Upon receiving the rollover signal, the inflator 62 inflates the airbag 64. The control module 84 comprises control circuitry that controls the operation of the ARS 50 including selectively disabling deployment of the airbag 64.

The ACS PCB 60 is enclosed in an enclosure 70. The enclosure 70 has one or more mount points such as 72-1, 72-2, 72-3, and 72-4 (collectively mount points 72). The enclosure 70 is mounted on a conducting surface (e.g., sheet metal) that is at a predetermined potential such as ground potential (i.e., 0 volts). The enclosure 70 is mounted using fasteners such as screws 74-1, 74-2, 74-3, and 74-4 (collectively screws 74) that are made of conducting material. When the enclosure 70 is mounted, the screws 74 physically contact the sheet metal. Once mounted, the enclosure 70 is fixed and cannot be moved or rotated. Consequently, the rollover sensor 82 detects a rollover when the vehicle experiences an imminent rollover.

The enclosure 70 may be made of conducting or non-conducting material. When the enclosure 70 is made of conducting material, the enclosure 70 may be insulated from the ACS PCB 60, the screws 74, and the sheet metal by using suitable insulating spacers.

The ACS PCB 60 comprises a ground sensing circuit 86. An input of the ground sensing circuit 86 is connected to a printed through-hole (PTH) 90 of the ACS PCB 60. When the enclosure 70 is mounted on the sheet metal, a conductor (hereinafter a cable) 88 connects the PTH 90 to one of the mount points 72 (e.g., mount point 72-1) as shown. The cable 88 is insulated and has first and second terminals 88-1 and 88-2, respectively, as shown in FIG. 2B. The first and second terminals 88-1 and 88-2 are conducting. The first terminal 88-1 is connected to the PTH 90 by a conducting screw 92. Alternatively, the first terminal 88-1 may be soldered to the PTH 90. The second terminal 88-2 is connected to the mount point 72-1 by the screw 74-1. Thus, the second terminal 88-2 and the input of the ground sensing circuit 86 are in electrical contact with the sheet metal via the screw 74-1 and are at ground potential (i.e., 0V).

Referring now to FIGS. 3A and 3B, an example of the ground sensing circuit 86 is shown. The ground sensing circuit 86 includes an electronic switch comprising a resistance R and a transistor T. The ground sensing circuit 86 senses when the enclosure 70 is mounted or is being dismounted by sensing a connection or a disconnection between the screw 74-1 and the sheet metal via the cable 88.

in FIG. 3A, when the enclosure is mounted on the sheet metal during normal operation, the second terminal 88-2 is connected to the mount point 72-1. The screw 74-1 fastens the enclosure 70 to the sheet metal through the mount point 72-1 and the second terminal 88-2. Since the screw 74-1 is conducting and physically contacts the sheet metal, the second terminal 88-2 is electrically connected to the sheet metal via the screw 74-1. Consequently, base B of transistor T is at ground potential (i.e., 0V). As a result, transistor T is turned off, and collector C of transistor T is in a first state. When collector C is in the first state, the ground sensing circuit 86 generates a first control signal. When the control module 84 receives the first control signal, the control module 84 determines that the enclosure 70 is properly mounted on the sheet metal. The control module 84 enables normal deployment of the airbag 64 in the event of a rollover.

Conversely, in FIG. 3B, when the enclosure 70 is being dismounted for maintenance, the screw 74-1 is unfastened. When the screw 74-1 is unfastened, the screw 74-1 does not physically contact the sheet metal. As a result, the second terminal 88-2 is electrically disconnected from the sheet metal. Consequently, base B of transistor T is not at ground potential. Instead, the base B is forward biased. As a result, transistor T is turned on, and collector C is in a second state. When collector C is in the second state, the ground sensing circuit 86 generates a second control signal. When the control module 84 receives the second control signal, the control module 84 determines that the enclosure 70 is being dismounted from the sheet metal. The control module 84 activates a safe mode and disables (i.e., inhibits) deployment of the airbag 64.

Thus, when the enclosure 70 is being dismounted, the ground sensing circuit 86 detects absence of ground potential via the cable 88 as the screw 74-1 is unfastened, and the control module 84 disables deployment of the airbag 64. Consequently, the airbag 64 does not deploy although the rollover sensor 82 may sense rollover when the enclosure 70 is rotated or otherwise moved while being dismounted. Skilled artisans can appreciate that the ground sensing circuit 86 may be implemented by using alternative and/or additional components.

Referring now to FIG. 4, a method 100 for disabling deployment of the airbag 64 when the ACS PCB 60 is being dismounted begins in step 102. The ground sensing circuit 88 senses whether the screw 74-1 is unfastened (i.e., whether the cable 88 is electrically disconnected from the sheet metal) in step 104. If false, the control module 84 determines in step 106 that the enclosure 70 is mounted on the sheet metal. The control module 84 enables normal deployment of the airbag 74 in step 108, and the method 100 returns to step 104. If, however, the result of step 104 is true, the control module 84 determines in step 110 that the enclosure 70 is being dismounted. The control module 84 disables normal deployment of the airbag 74 in step 112, and the method 100 returns to step 104.

Although the invention relates to vehicle safety systems, skilled artisans can appreciate that the invention can be practiced in applications comprising sensors that sense movement and that activate control systems upon sensing the movement. Additionally, although the rollover sensor 82, the control module 84, and the ground sensing circuit 88 are mounted on the PCB 60, skilled artisans can appreciate that the sensors, modules, and circuits described in the invention can be mounted in ways that suit particular applications. For example, the sensors, modules, and circuits can be arranged in integrated circuits (ICs).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for inhibiting deployment of an airbag, comprising:
   a rollover sensor;
   an enclosure that encloses said rollover sensor and that is mounted on a surface that is at a predetermined potential; and
   a circuit that is enclosed in said enclosure, that detects presence of said predetermined potential when said enclosure is mounted on said surface, that detects absence of said predetermined potential when said enclosure is dismounted from said surface, and that inhibits deployment of said airbag when absence of said predetermined potential is detected.

2. The system of claim 1 wherein said predetermined potential is ground potential.

3. The system of claim 1 wherein said circuit generates a first control signal that enables deployment of said airbag when presence of said predetermined potential is detected, and wherein said circuit generates a second control signal that inhibits deployment of said airbag when absence of said predetermined potential is detected.

4. The system of claim 3 further comprising a control module that is enclosed in said enclosure, that communicates with said rollover sensor and said circuit, that enables deployment of said airbag when said first control signal is received, and that inhibits deployment of said airbag when said second control signal is received.

5. The system of claim 1 further comprising a conducting fastener that fastens said enclosure to said surface, that contacts said surface when said enclosure is mounted or said surface, and that disconnects from said surface when unfastened.

6. The system of claim 5 further comprising a conducting cable having first and second ends, wherein:
   said first end communicates with said circuit;

said second end is connected to said conducting fastener when said enclosure is mounted on said surface; and said second end is electrically disconnected from said surface when said conducting fastener is unfastened, 7. The system of claim 6 wherein said circuit, said conducting cable, said conducting fastener, and said surface are insulated from said enclosure when said enclosure is made of a conducting material.

8. A method for inhibiting deployment of an airbag, comprising:

enclosing a rollover sensor in an enclosure;

mounting said enclosure on a surface that is at a predetermined potential;

detecting presence of said predetermined potential when said enclosure is mounted on said surface;

detecting absence of said predetermined potential when said enclosure is dismounted from said surface; and inhibiting deployment of said airbag when absence of said predetermined potential is defected.

9. The method of claim 8 wherein said predetermined potential is ground potential.

10. The method of claim 8 further comprising generating a first control signal when presence of said predetermined potential is detected and generating a second control signal when absence of said predetermined potential is detected.

11. The method of claim 10 further comprising enabling deployment of said airbag when said first control signal is received and inhibiting deployment of said airbag when said second control signal is received.

12. The method of claim 8 further comprising:

fastening said enclosure to said surface by a conducting fastener;

connecting said conducting fastener to said surface when said enclosure is mounted on said surface; and disconnecting said conducting fastener from said surface when said conducting fastener is unfastened.

13. The method of claim 12 further comprising:

connecting a first end of a conducting cable to an input of a circuit that detects presence and absence of said predetermined potential and that is enclosed in said enclosure;

connecting a second end of said conducting cable to said conducting fastener when said enclosure is mounted on said surface; and electrically disconnecting said second end from said surface when said conducting fastener is unfastened.

14. The method of claim 13 further comprising insulating said circuit, said conducting cable, said conducting fastener, and said surface from said enclosure when said enclosure is made of a conducting material.

15. The method of claim 8 further comprising inflating said airbag when said rollover sensor senses rollover and when presence of said predetermined potential is detected.

* * * * *